July 15, 1952 — G. P. WILLIAMS — 2,603,250

GLUE BLOCK CUTTING MACHINE ATTACHMENT FOR BAND SAWS

Filed Sept. 8, 1947

Inventor

George P. Williams

By *Clarence A. O'Brien and Harvey B. Jackson*, Attorneys

Inventor
George P. Williams
By Clarence A. O'Brien
and Harvey B. Jacobson
Attorneys July 15, 1952            G. P. WILLIAMS            2,603,250

GLUE BLOCK CUTTING MACHINE ATTACHMENT FOR BAND SAWS

Filed Sept. 8, 1947            4 Sheets—Sheet 3

Inventor
George P. Williams

By *Clarence A. O'Brien and Harvey B. Jacobson*
Attorneys

July 15, 1952 G. P. WILLIAMS 2,603,250
GLUE BLOCK CUTTING MACHINE ATTACHMENT FOR BAND SAWS
Filed Sept. 8, 1947 4 Sheets-Sheet 4

Inventor
George P. Williams

By Clarence A. O'Brien
and Harvey B. Jackson
Attorneys

Patented July 15, 1952

2,603,250

UNITED STATES PATENT OFFICE 2,603,250

GLUE BLOCK CUTTING MACHINE ATTACHMENT FOR BAND SAWS

George P. Williams, Portland, Oreg.

Application September 8, 1947, Serial No. 772,601

3 Claims. (Cl. 143—46)

This invention relates to improvements in glue block cutting machine attachments for band saws.

An object of the invention is to provide an improved glue block cutting attachment for band saws which will automatically saw longitudinally through the wood stock with a band saw and then cut off the stock which has been sawed into the desired lengths by means of a rotary power-driven saw.

Another object of the invention is to provide an improved glue block cutting attachment for band saws which will be detachably supported upon the band saw table in any desired manner, said attachment including a cast base upon which a gear casing is supported for mounting a gear reduction train of gears immersed in oil, together with automatic timed means for feeding wood stock to be split or sawed longitudinally by the band saw, and the power-driven rotary saw selectively timed with the operation of the band saw for transversely cutting off the wood stock after being sawed longitudinally by the band saw, to provide glue blocks of various predetermined lengths.

A further object of the invention is to provide an improved glue block cutting machine attachment for band saws which will include means for sawing square stock to produce triangular shaped blocks, and further means whereby stock may be supported upon a flat horizontal surface for being sawed to produce rectangular shaped glue blocks.

A still further object of the invention is to provide an improved glue block cutting machine attachment for band saws which will be highly efficient in operation and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
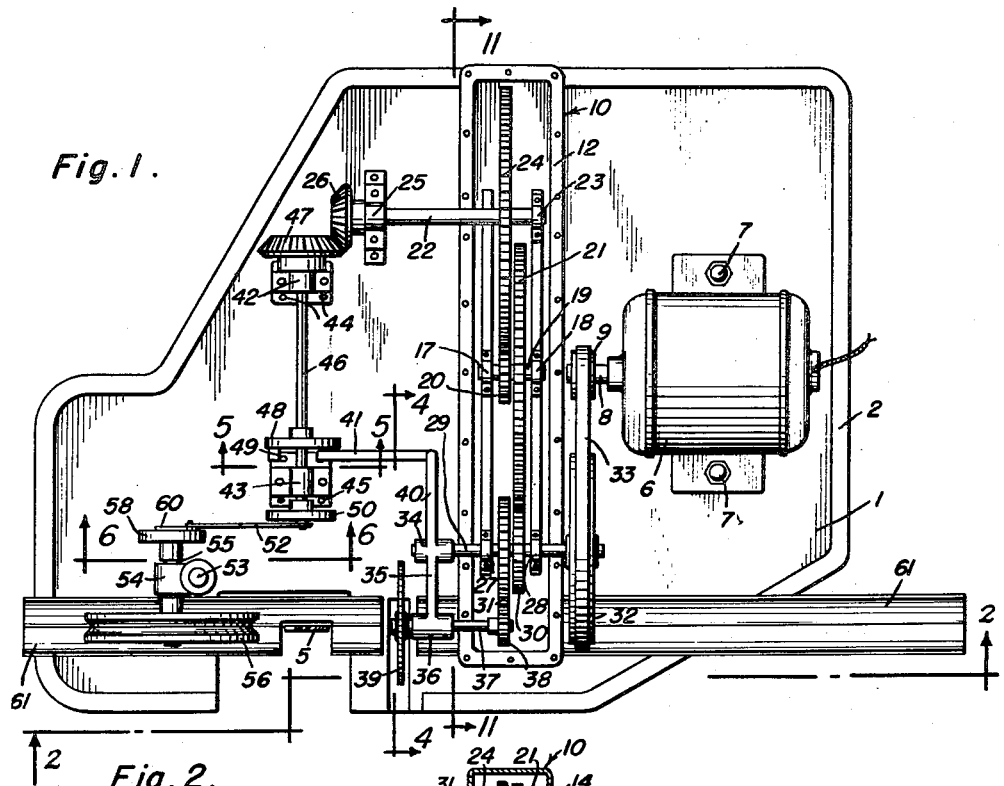
Figure 1 is a plan view of the improved glue block cutting machine attachment for band saws.
Figure 2:
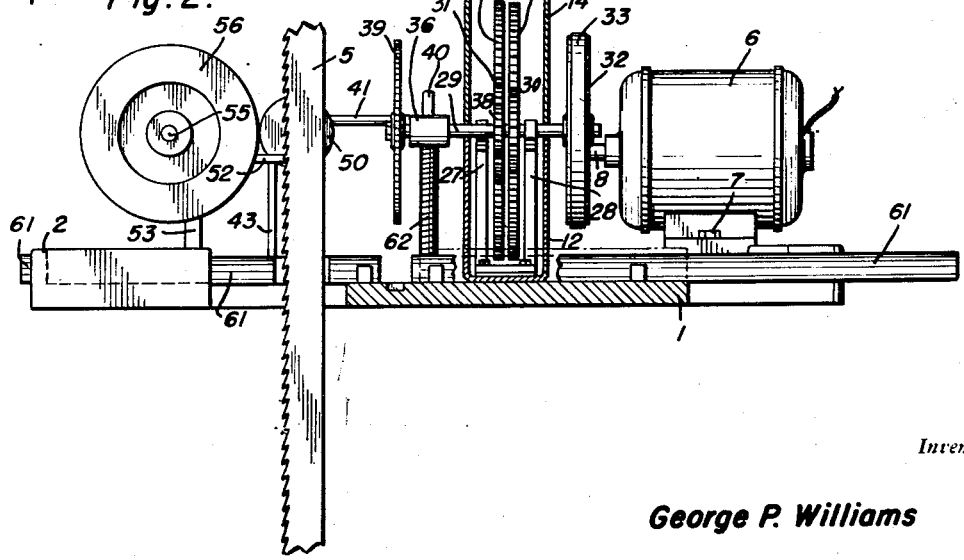
Figure 2 is a partial sectional view taken on the line 2—2 of Figure 1.

In carrying out the invention, there is provided an improved form of glue block cutting machine attachment for band saws comprising a cast base generally designated by the reference numeral 1 having an upstanding flange 2 formed about its peripheral edge.

Figure 3:
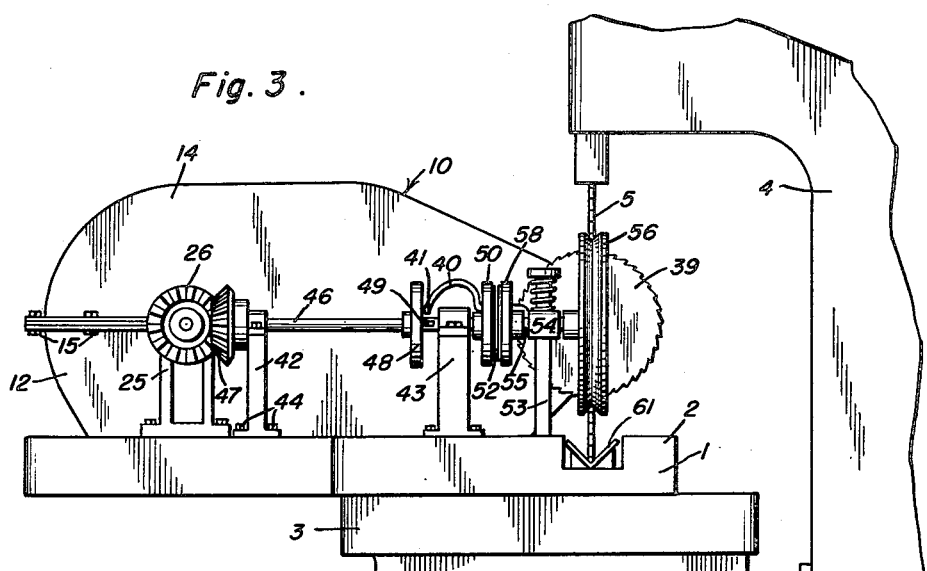
Figure 3 is an end view of the improved glue block cutting machine attachment for band saws.

The cast base 1 is adapted to be secured to and supported by the table 3 of a band saw machine (Figure 3) generally designated by the reference numeral 4, being provided with the usual form of band saw 5.

An electric motor 6 will be secured to one side of the cast base 1 by means of the bolts 7, and will be provided with a motor shaft 8 upon which the pulley 9 will be supported.

Figure 11:
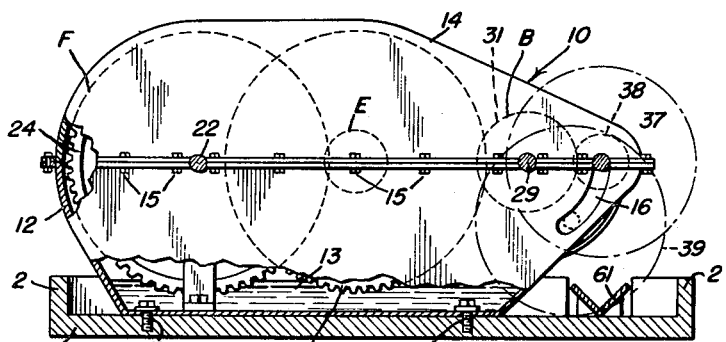
Figure 11 is a side elevation of the reduction gear casing taken on the line 11—11 of Figure 1 being partly broken away and in section.

An elongated gear casing generally designated by the reference numeral 10 will be secured to the cast base 1 adjacent the electric motor 6 by means of the bolts 11 (Figure 11) and comprises a lower portion 12 adapted to receive lubricating oil 13, and an upper removable cover or top portion 14 will be held upon said lower portion 12 by means of the bolts 15.

An arcuate slot 16 will be formed through one side of the lower portion 12 of the gear casing 10 for purposes hereinafter more fully described.

Upwardly extending spaced bearings 17 and 18 (Figure 1) will rotatably support the shaft 19 within the lower portion 12 of the casing 10, and a small gear 20 and large gear 21 will be fixed thereto, forming a part of the gear reduction mechanism housed within the gear casing 10.

The shaft 22 will be rotatably supported by the bearing 23 within the gear casing 10 to extend laterally of the casing, and will support the large gear 24 in fixed position thereon for meshing with the smaller gear 20. A bearing 25 for the outer end of the shaft 22 will be supported upon the cast base 1, and a bevel gear 26 will be secured to the outer end of said shaft 22.

Transversely spaced bearings 27 and 28 will be disposed in the gear casing 10 for rotatably supporting the driven shaft 29 which extends beyond the opposite sides of said casing. A small gear 30 will be secured upon the shaft 29 for meshing with the large gear 21, and a larger gear 31 will also be secured upon the shaft 29. A large pulley 32 will be secured upon one end of the shaft 29 and will be connected by means of a belt 23 with the pulley 9 secured upon the shaft 8 of the electric motor 6 for driving the gear reduction mechanism.

A bearing hub 34 will be rockably supported upon the opposite end of the driven shaft 29, and will be formed integrally with the forwardly extending arm 35 upon which the bearing 36 is disposed for rotatably mounting the shaft 37. A small gear 38 is mounted on one end of the shaft 37 which extends through the arcuate slot 16 in the lower portion 12 of the gear casing 10, said gear 38 meshing with the gear 31. A small rotary saw blade 39 will be mounted upon the outer end of the shaft 37 for sawing off the stock into the desired length for producing the glue blocks hereinafter described.

A rearwardly extending inverted U-shaped arm 40 is formed integrally with the hub 34, and is formed with a lateral extension 41.

Figure 4:
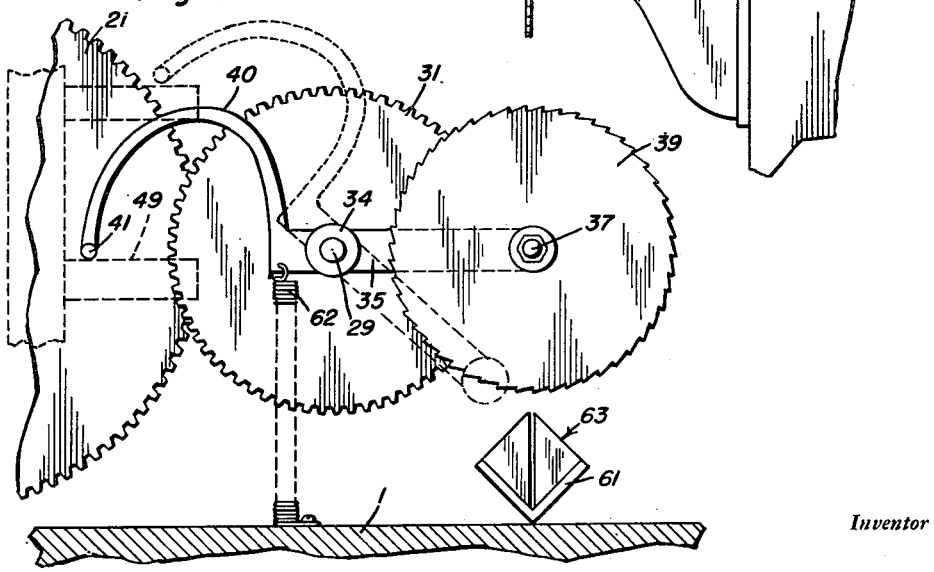
Figure 4 is a view taken on the line 4—4 of Figure 1 with certain parts being omitted.
Figure 5:
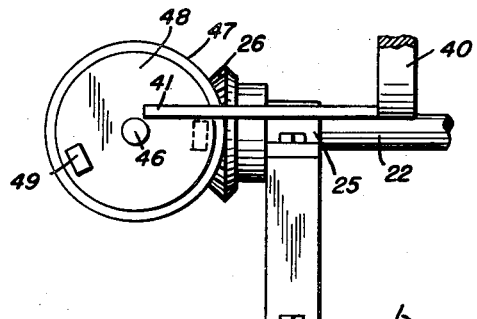
Figure 5 is a partial sectional view taken on the line 5—5 of Figure 1.

A pair of spaced upstanding bearings 42 and 43 will be secured to the cast base 1 by means of the bolts 44 and 45, and will rotatably support the shaft 46. A bevel gear 47 is mounted on one end of the shaft 46 for meshing with the bevel gear 26. A cam supporting wheel 48 will be secured to the opposite end of the shaft 46, and will be formed with a cam lug or pin 49 on its outer surface for intermittent engagement by the lateral extension 41 for causing the hub 34 to rock upon the shaft 29 to force the shaft 37 upon which the rotary saw blade 39 is fixed downwardly in the arcuate slot 16 in the side of the lower portion 12 of the gear casing 10 to effect the cutting of the material or stock 63 (Figure 4) after it has been fed through the band saw 5.

Figures 6, 7:
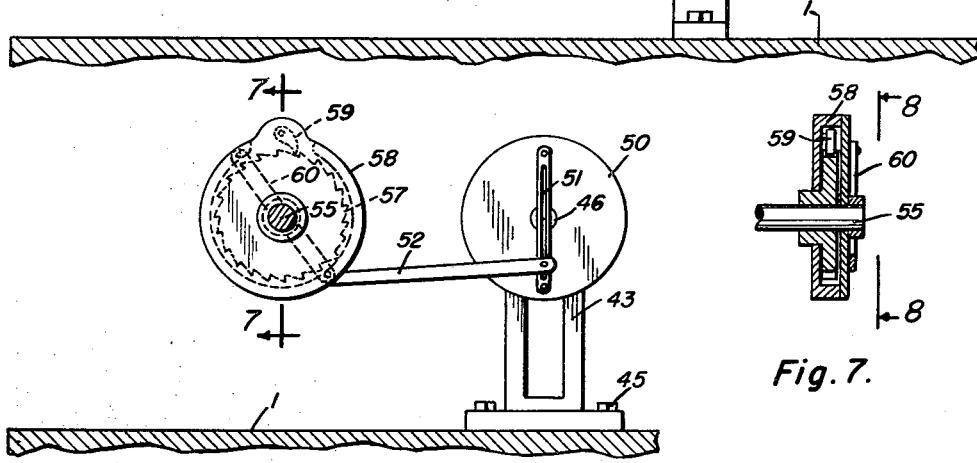
Figure 6 is a view taken on the line 6—6 of Figure 1.
Figure 7 is a sectional view taken on the line 7—7 of Figure 6.
Figure 8:
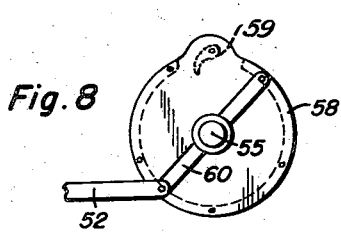
Figure 8 is a view taken on the line 8—8 of Figure 7.
Figure 10:
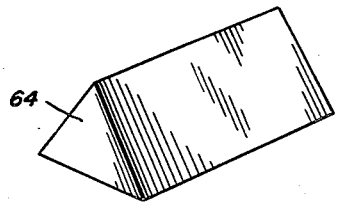
Figure 10 is an enlarged perspective view of one of the triangular shaped glue blocks.
Figure 9:
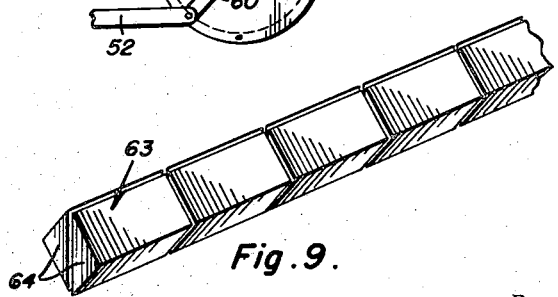
Figure 9 is a perspective view of a piece of stock material from which the glue blocks are formed, showing the same cut longitudinally and transversely.

A throw adjusting wheel 50 is secured to the end of the shaft 46 remote from the bevel gear 47, and is formed with a diametrically disposed slot 51 (Figure 6) in its outer face for variably and adjustably supporting one end of the connecting rod 52 for changing the throw and timing of said connector rod 52, depending upon the length of the glue blocks being cut.

An upstanding post or support 53 will be secured to the upper surface of the cast base 1, and will support the bearing 54 on its upper end. A shaft 55 will be rotatably mounted in the bearing 54, and will support the grooved work feeding wheel 56 on one end, and a ratchet drive wheel 57 on its opposite end, the same being disposed within the housing 58 which is loosely mounted thereabout. A dog or pawl 59 will be pivotally supported in the housing 58 for engagement with the teeth of the ratchet drive wheel 57, and a cross-arm 60 will be mounted upon the shaft 55 exteriorly of the housing 58, for connection with the opposite end of the connecting rod 52.

A V-shape feed trough 61 will be detachably supported upon the base 1 for supporting the square stock 63 which will be disposed with one corner extending downwardly and will be positively engaged by the grooved feed wheel 56 as it is driven by the ratchet feed mechanism for feeding the stock 63 to and through the band saw 5, thereby cutting the stock into two strips which are of triangular shape in cross section.

The continued operation of the machine will bring the arm 41 into contact with the cam pin or lug 49 at every revolution of the wheel 48, thereby raising the arm and lowering the rotary saw blade 39 supported on the forward end of said pivoted arm for cutting off the ends of the split or sawed stock into the desired lengths. A coil spring 62 (Figure 4) will be connected between the arm 40 and the cast base 1 for resiliently tensioning said arm for positively raising the saw 39 and its supporting shaft 37 upwardly in the arcuate groove 16 formed in the lower portion 12 of the casing 10 after each operation or cut has been made by the saw 39. Hence, it will be seen that the triangular shaped glue blocks 64 may be produced at a relatively high rate of speed by a continued operation of the band saw 5 and the rotary saw 39 which are simultaneously operated and selectively timed and controlled.

In the event that it is desired to produce glue blocks of rectangular shape instead of triangular shape, the V-shape troughs 61 may be completely removed.

Figure 12:
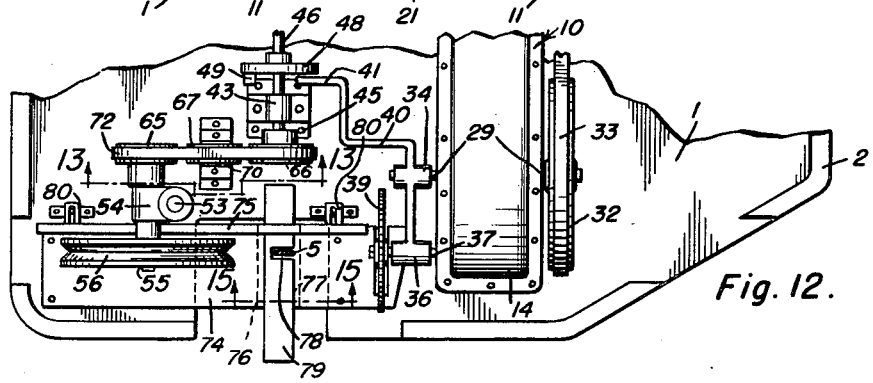
Figure 12 is a plan view of a modified form of work support and work feeding mechanism.
Figure 13:
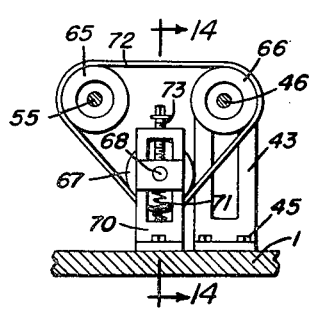
Figure 13 is a partial sectional view taken on the line 13—13 of Figure 12.
Figure 14:
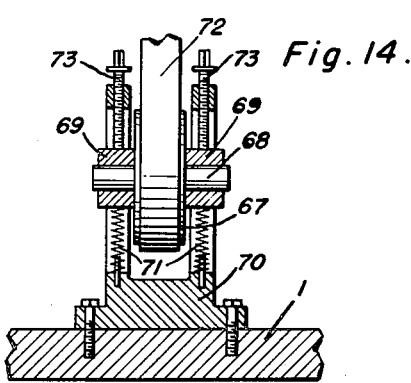
Figure 14 is an enlarged detail sectional view taken on the line 14—14 of Figure 13.
Figure 15:
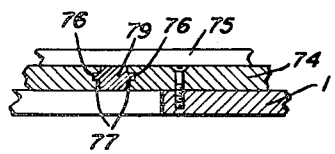
Figure 15 is a sectional view taken on the line 15—15 of Figure 12.

When it is desired to rip the stock continuously, the ratchet arm and adjusting wheel may be removed from their supporting shafts and replaced by the three small pulleys 65, 66 and 67 (Figures 12 and 13). The pulley 65 will be placed upon the shaft 55 in place of the ratchet drive wheel 57, the pulley 66 will be positioned upon the shaft 46 in place of the connecting rod throw adjusting wheel 50, and the pulley 67 will be supported upon the shaft 68 mounted in the guide 69 supported upon the bracket or standard 70 for vertical adjustment. Coil springs 71 will be used for resiliently cushioning the pulley 67 in adjusting the feed belt 72 which is disposed about the pulleys 65, 66 and 67. Adjusting bolts 73 will extend through the upper end of the bracket or standard 70 for engagement with the upper surface of the guide 69 for forcing the same downwardly against the resilient tension of the coil springs 71. The stock (not shown) as it is being continuously fed to the band saw will be engaged by the feed belt 72, being driven through the reduction gearing in the gear casing 10 and the electric motor 6 connected therewith.

A flat table 74 is provided for attaching to the cast base 1 and is formed with a ripping gauge 75 so that ordinary glue block stock can be ripped square by the use of the band saw 5. The table 74 is formed in two parts, with an opening of approximately two inches being provided between said parts, and oppositely disposed grooves 76 are formed in the opposite edges of said parts for slidably receiving the oppositely and outwardly extending tongues 77 on the saw guide tongue 79 which is adjustably supported between said parts of the table. A slot 78 is formed in one edge of the guide tongue 79 in which the band saw 5 will be always running at exactly the same spot. The gauge 75 has two guide brackets 80 fastened to the base I for adjusting the position of the same, as desired.

From the foregoing description, it will be seen that the improved glue block cutting machine attachment may be secured to a band saw and set to cut any predetermined size of triangular or rectangular shaped glue blocks from stock as it is positively fed through the machine.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. In a glue block cutting machine, a swinging cutter comprising a base having a work support thereon, a power driven shaft rotatably supported on the base, a power driven disk also rotatably supported on the base with its axis of rotation at right angles to the axis of rotation of said shaft, a bearing hub rockably supported on one end of the shaft, a forwardly extending arm projecting laterally from the bearing hub, a bearing fixed to the arm and paralleling the hub, a cutter holding shaft rotatably supported by the bearing and operatively connected to the power driven shaft for rotation therewith, a saw blade mounted on said holding shaft, a rearwardly extending inverted U-shaped arm integrally formed with and projecting laterally from the hub, a lateral projection forming part of said U-shaped arm and extending across the face of said disk, and a pin secured eccentrically to the disk for engaging said lateral projection to rock the hub, arm and saw about the power driven shaft.

2. A swinging cutter attachment for glue block cutting machines, said attachment comprising a base, a horizontally disposed power driven shaft supported for rotation on the base, a vertically disposed rotatable disk also supported for rotation on the base and having its axis of rotation disposed at right angles to the shaft, a bearing hub rockably supported on one end of the shaft, a forwardly extending arm fixed to and projecting laterally from the hub, a rearwardly extending inverted U-shaped arm having a forward limb secured at its lower end to the hub diametrically opposite from said forwardly extending arm, a horizontal projection fixed at one end to the other limb of said U-shaped arm and extending across the face of the disk, a lug secured eccentrically to the disk for selectively engaging and releasing the projection to impart rocking motion to the hub, a horizontal bearing fixed to the forwardly extending arm and paralleling the hub, a cutter holding shaft rotatably supported in the bearing and operatively connected to the power driven shaft to rotate therewith, a cutter supported on the holding shaft, and a coil spring terminally secured to said base and said U-shaped arm and yieldingly restricting raising of said projection as the lug rides upwardly thereagainst.

3. In a glue block cutting machine, a swinging cutter comprising a base, a power driven shaft rotatably supported on the base, a power driven disk also rotatably supported on the base with its axis of rotation at right angles to the axis of rotation of said shaft, a bearing hub rockably supported on one end of the shaft, a forwardly extending arm projecting laterally from the bearing hub, a bearing fixed to the arm and paralleling the hub, a cutter holding shaft rotatably supported by the bearing and operatively connected to the power driven shaft for rotation therewith, a saw blade mounted on said holding shaft, a rearwardly extending inverted U-shaped arm integrally formed with and projecting laterally from the hub, a lateral projection forming part of said U-shaped arm and extending across the face of said disk, a rotary work feeding member supported on the base for rotation and paralleling the disk, said feeding member adapted to feed work beneath the cutter, a second disk connected central to and spaced parallel to the first named disk and operatively connected to said work feeding member, and a single power driven shaft supporting both of said disks.

GEORGE P. WILLIAMS.

REFERENCES CITED

The following references are of record in the file of this patent:

UNITED STATES PATENTS

| Number | Name | Date |
| --- | --- | --- |
| 293,037 | Kautz | Feb. 5, 1884 |
| 453,893 | Smith | June 9, 1891 |
| 477,756 | Hayes | June 28, 1892 |
| 632,100 | Carson | Aug. 29, 1899 |
| 877,124 | Robinson et al. | Jan. 21, 1908 |
| 909,454 | Pye | Jan. 12, 1909 |
| 1,264,332 | Prezepiorka | Apr. 30, 1918 |
| 1,463,303 | Adair et al. | July 31, 1923 |
| 1,803,402 | Napier | May 5, 1931 |
| 2,302,961 | Kramer | Nov. 24, 1942 |
| 2,385,205 | Hobbs | Sept. 18, 1945 |
| 2,468,214 | LaRosa | Apr. 26, 1949 |

FOREIGN PATENTS

| Number | Country | Date |
| --- | --- | --- |
| 136,028 | Germany | Nov. 28, 1902 |
| 282,130 | Italy | Feb. 2, 1931 |